United States Patent Office 3,235,354
Patented Feb. 15, 1966

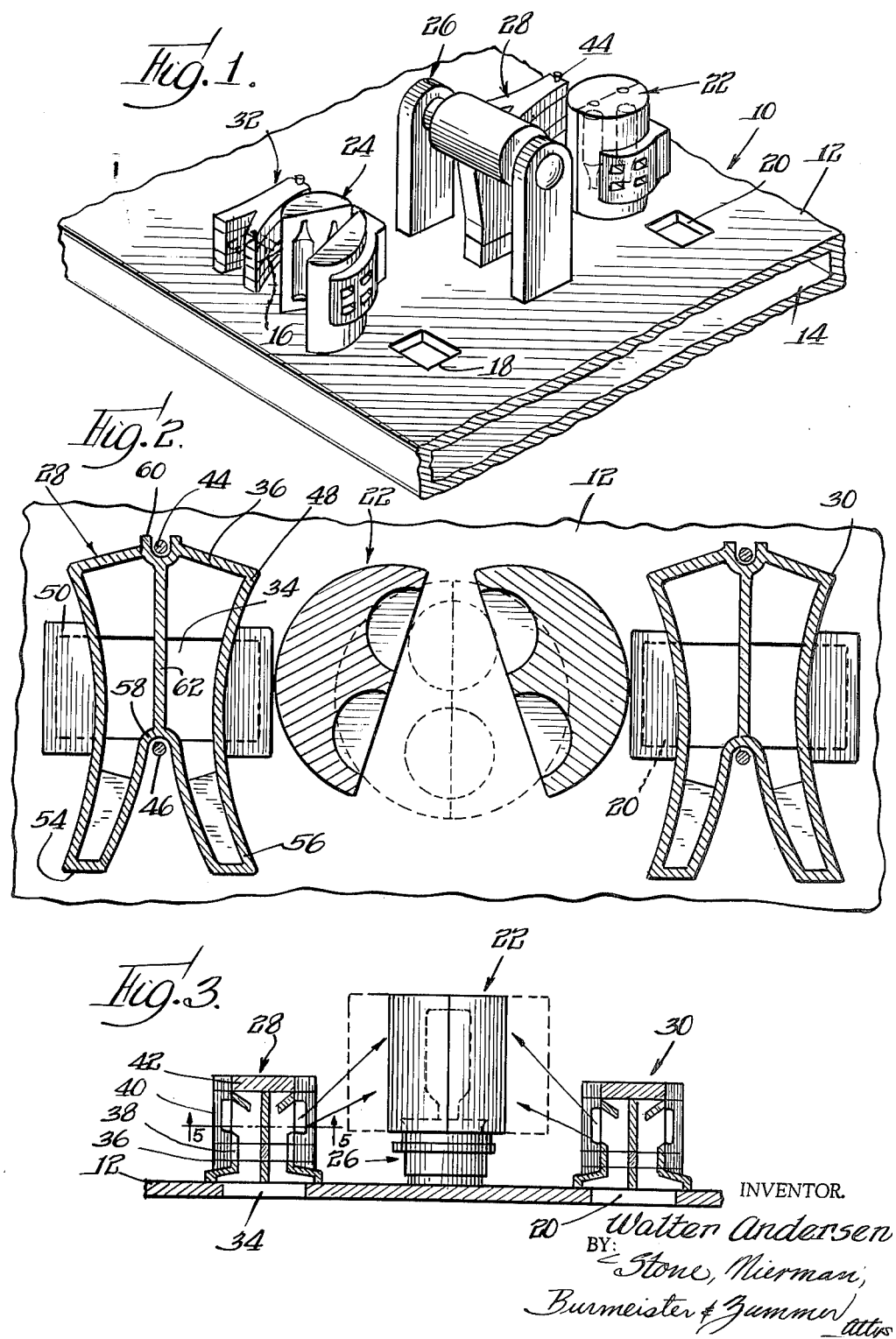

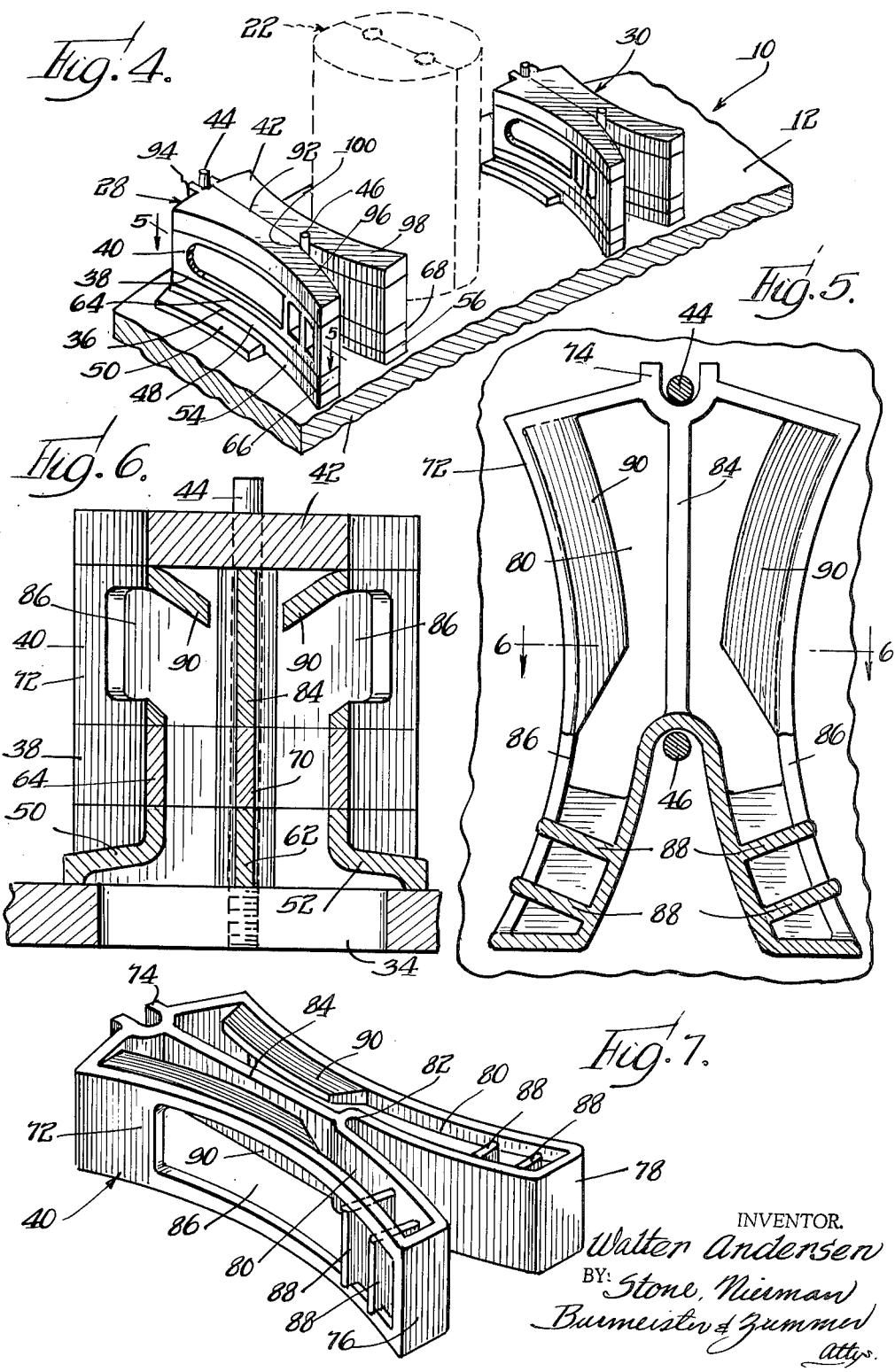

3,235,354
WINDBOX COOLER FOR A BOTTLE MACHINE SPLIT MOLD
Walter Andersen, Streator, Ill., assignor to Chem-Met-Andersen Engineering Company, Chicago, Ill., a corporation of Illinois
Filed Mar. 12, 1962, Ser. No. 178,890
9 Claims. (Cl. 65—355)

This invention relates to an improvement for a glass bottle making machine and more specifically to an improved device for cooling parison and blow molds of such a machine. In the manufacture of glass bottles a gob of glass is first formed into a blank in a parison mold and then the blank parison is blown into a glass bottle in the blow mold. A gob of hot glass is delivered to the parison mold where the gob is formed into a blank parison. In certain instances it is possible to devise a parison mold which has two individual molds in line in order to receive two gobs of glass thereby making the parison mold a double gob mold. Thus, two blanks are formed at one time rather than one blank to double the capacity of the machine. The double gob parisons being transferred in the same manner as the single gob procedure.

It is customary to form the neck of the bottle in the parison mold. Thus it may be appreciated that the glass must run freely into the neck forming portion of the mold in order to form a complete neck. It is also readily apparent that inasmuch as hot glass at a temperature of approximately 2,000 degrees Fahrenheit is used, it is necessary to cool the molds, especially the double parison molds.

Cooling of molds in a glass bottle making machine is accomplished by use of wind towers which deliver air under pressure to the molds. Most of the present day machines have a wind tunnel in a section base which receives air under pressure through the tunnel. The section base has apertures contained therein with the wind towers mounted above the apertures to distribute the air which flows up into the towers. The present day construction of the wind towers is such that holes are provided in the towers so that air under pressure leaves the towers and is directed in a path which is substantially perpendicular to the molds. It may be appreciated that the wind has a high degree of turbulence around the molds and the cooling of the molds is not efficient. Furthermore, the paths at 90 degrees to the molds causes localized cooling; i.e., certain portions of the mold are cooler than others. In some instances, an attempt is made to alleviate this condition by providing a plurality of apertures in the towers, so that the localized cooling occurs at several points along the mold. In no event, is there any cooling of the parison mold at the portion adjacent to the neck forming portion of the bottle, inasmuch as this portion must not be too cool when the glass enters the parison mold so that the glass may flow freely in order to form a complete mouth or ring. It is therefore one of the principal objects of the present invention to provide a wind box for use on a glass bottle making machine which wind box cools uniformly its respective mold.

It is another object of the hereindisclosed invention to provide a wind box for use on a glass bottle making machine which wind box directs cooling wind uniformly over a substantial portion of a parison mold when the mold is closed but cools the neck portion of the mold when the mold is open.

It is another object of the hereindisclosed invention to provide a wind box for a glass bottle making machine which wind box may be mounted on existing glass bottle making machines but which wind box is narrower to provide a greater degree of safety in the machine.

It is a still further object of the instant invention to provide a wind box for a glass bottle making machine which wind box directs wind against adjacent molds but which wind has a minimum amount of turbulence adjacent to the mold.

It is still another object of this invention to provide a wind box for a glass bottle making machine which wind box includes a minimum number of parts for directing wind toward a mold.

It is a further object of the present invention to provide a wind box in combination with a mold of a glass bottle making machine in which wind directed by the wind box toward the mold for cooling the mold has a minimum amount of turbulence and the wind is readily carried away from the glass bottle making machine.

Other objects and uses of the hereindisclosed invention will become readily apparent to those skilled in the art upon a perusal of the appended specification in light of the accompanying drawings in which:

FIGURE 1 is a perspective view of a section of a glass bottle making machine with parts omitted in order to show clearly the positioning of various parts;

FIGURE 2 is a cross-sectional view of a mold and a pair of wind boxes on opposite sides of the mold;

FIGURE 3 is a cross-sectional view showing a mold in a closed attitude between a pair of wind boxes and showing the mold in an open attitude in dotted form to show how the wind strikes the mold in the two attitudes;

FIGURE 4 is a perspective view of a pair of wind boxes with a mold positioned between the wind boxes showing the wind boxes more in detail;

FIGURE 5 is a cross-sectional view of one of the wind boxes taken on line 5—5 of FIGURE 3;

FIGURE 6 is a cross-sectional view taken on line 6—6 of FIGURE 5; and

FIGURE 7 is a perspective view of a wind director which constitutes a portion of the wind box shown in FIGURES 5 and 6.

Referring now to the drawings, and especially to FIGURE 1, numeral 10 identifies one portion of a section of a glass bottle making machine. It should be noted that a glass bottle making machine generally consists of a plurality of sections which includes not only the molds and invert arm but also items such as scoop mechanisms for picking up molten glass, mold opening and closing mechanisms, take out mechanisms and timing drums, as well as many other parts, none of which are shown herein, inasmuch as they are all well-known. A section box 12 has a wind tunnel 14 contained therein which wind tunnel is connected to a source of air under pressure provides the support for the pertinent parts of the present invention. Air passages 16, 18 and 20 are cut into the section plate to provide a means for allowing air to leave wind tunnel 14. A split parison mold 22 is movably mounted on the bed 12. A conventional mold operating mechanism opens and closes the parison mold. However, that mechanism is not shown inasmuch as it is well-known. It should be noted that air passageway 20 is positioned adjacent to the parison mold 22. A similar passageway is positioned on the other side of the parison mold but that passageway is not shown herein. A blow mold generally indicated by numeral 24 is also a part of section 10 of the glass making machine. The blow mold 24 has passageways 16 and 18 on opposite sides of the mold to provide cooling wind to the mold as will be described hereinafter. A conventional invert arm mechanism generally indicated by numeral 26 is positioned between the molds 22 and 24. The invert arm mechanism carries blanks or parisons from the parison mold 22 to blow mold 24 and inverts the blanks as the name implies.

Looking now to FIGURE 4 which shows in perspective the parison mold 22 positioned between a wind box 28 and a second wind box 30 which second wind box 30 is not shown in FIGURE 1 for purposes of clarity. Wind box 30 is identical in construction to wind box 28 and wind box 28 is identical in construction to a third wind box 32 which is positioned adjacent to blow mold 24. The wind box 28 is positioned over a wind aperture 34 which is identical to the apertures 16, 18 and 20 in plate 12 so that air under pressure in tunnel 14 passes through the aperture 34 and into wind box 28 where the air is distributed.

The wind box 28 is a shell made up of various parts and generally includes an adapter 36 mounted on the plate 12, a spacer 38 mounted in registry with the upper portion of the adapter, a wind director 40 mounted on top of spacer 38 and a cap 42 positioned on top of the wind director to close the wind box. The various parts of the wind box are kept in place by a pair of rods 44 and 46 which are threadedly mounted in the section plate 12.

Considering now specifically the construction of adapter 36, the adapter has an apertured body 48 which has formed integral therewith a pair of ears 50 and 52 which extend beyond the outer edges of aperture 34. The body also has formed integral therewith a pair of hollow arms 54 and 56 to provide a conduit for air coming out of wind aperture 34 into an elongated portion of the adapter. Between the arms there is a yoke 58 which is engageable with post 46 to hold the adapter in position. A pair of ears 60 are formed integral with the body 36 and are engageable with the other post 44 to fix the position of the adapter in a lateral direction. The adapter is completed by a divider 62 which is an integral part of the adapter and extends from the yoke 58 to the ears 60 to divide the adapter into two equal halves so that air flowing out of air aperture 34 is divided equally between the two halves of the adapter.

As was mentioned above, the spacer 38 is positioned above the adapter 36 and in registry with the upper portion of the adapter. The spacer also has an apertured body 64 and a pair of arms 66 and 68 formed integral with the body. The spacer also has a yoke between the arms engageable with the post 46 as well as a pair of ears which are engageable with post 44 to hold the spacer in position. Neither the yoke nor the ears are shown inasmuch as their construction is identical to the yoke and ears of the adapter. The adapter has an integral divider 70 extending between its ears and yoke portions which adapter 70 is in registry with divider 62 of the adapter. The principal function of the spacer 38 is to determine the level of the wind director 40 relative to the plate 12.

Looking now to FIGURES 5, 6 and 7, the construction of the wind director 40 may be clearly seen. The wind director 40 includes a body 72 which has formed integral therewith a pair of ears 74 which ears are identical to the ears of the spacer and the adapter. A pair of arms 76 and 78 are formed integral with the body 72 and each of the arms has an aperture 80 which extends into the body of the wind director. The arms 76 and 78 form a yoke 82 which yoke is identical to the respective yokes of the spacer and the adapter and is engageable with the post 46 to hold the wind director in a lateral position. A divider 84 extends from the ears 74 to yoke 82 to divide the wind director into two equal halves and the divider is aligned with dividers 70 and 62 of the spacer and adapter, respectively. The wind director also contains a wind outlet aperture 86 on opposite sides thereof as may be clearly seen in FIGURE 5. Each of the wind outlet apertures extends from its respective portion of the body 72 into the respective arms 76 and 78. A pair of vertical baffles 88 is positioned in each of the arms 76 and 78 and being aligned with the respective wind outlet apertures 86 to provide a means for directing air leaving the wind director. A wind deflector 90 is formed integral with the upper portion of body 76 adjacent to each of the respective wind outlet apertures to provide a means for directing in a vertical direction air leaving the wind outlet apertures for reasons which will become apparent hereinafter. It is readily apparent that the only outlet for the wind box is the wind outlet apertures 86, inasmuch as the cap 42 closes the upper end of the wind director.

The cap 42 is made of a solid piece of metal and is heavy enough to stay on top of the wind director in spite of the air pressure inside the wind box. The cap includes a solid body 92 which has a pair of ears 94 formed integral therewith for engagement with the post 44. A pair of arms 96 and 98 are also formed integral with the body and the arms 96 and 98 have the same outline as arms 76 and 78 of the wind director in order to close the wind director. These arms 96 and 98 form a yoke 100 which is engageable with post 46 to hold the cap in a lateral direction.

In operation, each of the wind boxes is mounted on the table 12 in the same manner; i.e., the various sections are placed in between the respective rods to hold the portions of the wind box in position. Referring specifically to wind box 28, the adapter 36 is first positioned over the wind aperture 34 so that the ears 50 and 52 cover the entire wind aperture 34. The spacer 38 is then positioned above the adapter. It should be noted that though only one spacer is shown in the instant case an increased number of spacers may be used to raise the level of the wind outlet aperture to a selected height. It is also evident that the spacer may not be used when it is desired to keep the wind outlet aperture at a level immediately adjacent to the plate. With the adapter and spacer in position, the wind director is placed over the spacer between the rods. The cap is then placed on top of the wind director in order to complete the wind box.

It should be noted at the present time that inasmuch as the glass bottle making machines are made up of a plurality of sections, one wind box between a pair of sections will cool molds in adjacent sections. As may be seen in FIGURES 1 and 4, wind box 28 cools parison mold 22 with one half of the air and the other half of the air entering the wind box 28 is directed to a parison mold adjacent to parison mold 22 which parison mold is not shown in this instance. The wind box 30 also cools the parison mold 22 and a parison mold on the other side of parison mold 22 which parison mold on the other side of parison mold 22 is also not shown.

As was mentioned above, air under pressure is provided by a conventional source which is not shown to the wind tunnel 14. The air under pressure leaves the wind tunnel through aperture 34 and the air is divided by the dividers 62, 70 and 84 into two substantially equal halves. As the wind enters the adapter 36 a portion flows into arms 54 and 56 which wind then flows upward into the arms of spacer 36 and of course a portion of the wind flows into the body of the spacer. The wind leaving the spacer flows into the wind director 40. Inasmuch as the upper portion of the wind director is closed by cap 42, the wind must leave through apertures 86 and the baffles and wind deflector associated with each of the wind outlet apertures directs the path of the wind leaving the wind director.

The wind flowing out of the wind director is directed to the parison mold in a manner to provide maximum cooling of the parison mold. It should be noted that the parallel baffles 88 direct the wind in a direction which is toward the parison mold. As may be seen in FIGURES 2, 5 and 7, the outside portion of the body as well as each of the arms of the wind director has an arcuate outline which arcuate outline has its center proximate the center of the parison mold. It is therefore readily apparent that the baffles 88 direct the wind inward toward the parison mold. The deflector 90 changes the direction of the wind so that it has a path which defines an acuate angle with the original vertical path of the wind. It is to be appreciated that the wind is somewhat diffused as it leaves the wind outlet aperture. Furthermore, that portion of the wind which is affected by the baffles 88 also has a tendency to affect the wind which has been changed in its direction by the deflector 90 to keep the wind directed inward.

Inasmuch as the wind leaving the wind box is at an angle less than 90 degrees from its original path, the wind has a novel effect in cooling the parison mold 22. Since the parison mold is spaced some distance from the wind box when the mold is in a closed attitude as to evident from FIGURE 3, the wind is generally directed to an upper portion of the mold so that the upper portion of the mold is cooled when the mold is closed. It should be appreciated that, inasmuch as the wind is generally cooling the upper portion of the mold the lower portion of the mold which contains the neck mold or the neck forming portion, that portion of the mold is not being cooled appreciably so that the neck of the blank may be formed without chilling. When the mold is open, the portion of the parison mold having the neck forming portion is then cooled.

After the parison has been formed and the parison mold opens so that the invert arm may remove the parison from the mold, the halves of the parison mold are placed adjacent to the wind boxes 28 and 30. The halves of the parison mold are adjacent to the wind boxes so that though the wind is directed slightly upward the distance that the wind travels before it strikes the parison mold is so small that the wind is directed primarily onto the portion of the mold forming the neck of the blank. Thus, the neck forming portion of the mold is cooled when the mold is in its open attitude thereby minimizing the possibility of chilling the glass in the mold. As may be clearly seen in FIGURE 2, when the mold is in an open attitude, the arms of the wind director extend beyond the parison mold and the baffles in the wind director force air to the interior portion of the mold. It should be noted that in this instance the parison mold is shown as a two gob or double gob mold and there is customarily a problem with cooling the back or inside mold of a double gob mold. With the wind being directed into the interior of the mold, when the mold is in an open attitude, the back or inner mold is properly cooled.

It is readily apprent that when the mold closes again to receive a gob of glass the wind is then automatically directed to the upper portion of the parison mold and distributed uniformly over the mold rather than being directly to one spot in the mold to cause chilling of a particular section of the mold. It should also be noted that the baffles direct the wind toward the mold at all times so that all sides of the mold receive cooling wind rather than having a concentration in one area.

Although the discussion above has been in connection with a parison mold, it is readily apparent that the instant wind box is equally effective when used with a blow mold as well.

Another important aspect of the instant invention is the safety feature which is inherent in the present wind box and the improved efficiency which may be achieved by using the present wind box. Many of the glass bottle making machines which are still in use at the present time are single gob machines; i.e., only one blank and bottle is formed in each section during the course of one operation. It is self-evident that reductions in cost of production may be achieved by converting the single gob machines to double gob machines. A double gob machine forms two blanks and bottles in the same time that it takes to form a single blank and bottle in a single gob machine. Using the prior art wind boxes, it is impossible to convert a single gob machine to a double gob machine, inasmuch as the double gob molds must be opened an increased distance to allow the blanks and bottles to be removed from the back mold. Thus, there is an interference between the mold and the wind box. By using the instant wind box which is an elongated wind box, the wind boxes may be positioned between molds for a double gob operation even though the machine was originally designed as a single gob machine. Along with the improved economy is a more important feature for the operator. It is customary in glass bottle plants for an operator to "test" the wind by inserting his hand between the wind box and the mold in order to feel the intensity and temperature of the wind. In most instances the operator has the speed of the machine gauged properly and his reflexes are sufficiently quick so that he is able to insert his hand between the mold and the wind box and remove it before the mold opens. However, there are many instances when the machine is quicker than the hand so that the operator's hand is caught between the mold and the wind box. Since the temperature of the mold is usually close to 1,000 degrees Fahrenheit because molten glass is being formed in the mold, not only is the operator's hand crushed but it is also severely burned before the cycle of the machine closes the mold.

In the instant device, the operator's hand may not be trapped between the wind box and the mold. There is sufficient space between the wind box and the open mold so that, though the mold may open, the operator's hand is not squeezed between the mold and the wind box. Though there may be a certain amount of discomfort because of the proximity of the mold at a high temperature, the operator's hand is not crushed nor is it severely burned.

Another important aspect of the hereindisclosed wind boxes is the fact that the present wind box needs only one wind outlet aperture. In present practice several wind outlet aperatures are provided in a wind box should a mold be rather long. It is apparent from the instant construction that the hereindisclosed wind boxes have a fanning effect; i.e., the wind fans out to have a large overall cooling over the mold rather than a cooling at a specific portion results in chilling of the mold at one point. It should further be noted that inasmuch as the wind is directed slightly upward a substantially steady state flow is created whereby the wind flows upward past the mold and out of the machine. It is customary in glass bottle making plants to have an exhaust fan at the roof so that the heated wind which has been used as a coolant flows upward and is pushed out of the plant and more air is taken into the plant. Since the wind is directed slightly upward, the amount of turbulence is substantially decreased so that there is a greater flow of air past the mold without an increase in pressure in the wind tunnel 14 thus providing improved cooling of the mold since there is an increased flow of the coolant wind past the mold. It is also self-evident that inasmuch as there is an increase in rate of flow of coolant past the mold there is a greater temperature differential between the coolant and the mold during the time that the coolant is in contact with the mold, so that there is also a further increase in effectiveness of the coolant.

Although a specific embodiment of the hereindisclosed invention has been shown and described in detail above, it is to be expressly understood that those skilled in the art may make various modifications and changes in the instant invention without departing from the spirit and scope thereof. It is to be further understood that the present invention is limited only by the appended claims.

What is claimed is:

1. A wind box for use in a glass bottle making machine to cool molds comprising, in combination, an adapter removably mounted on a plate of the glass bottle making machine covering an aperture in the plate for receiving air under pressure, said adapter having a hollow adapter body and a pair of hollow adapter arms extending from said body, a pair of ears formed integral with the adapter body and extending outwardly from opposite sides of the body to cover a portion of the wind aperture in the plate to direct air into the adapter body and the adapter arms, a divider extending through the central portion of the adapter body to divide the body into two substantially equal halves, a wind director positioned above the adapter and communicating with the adapter, said wind director having a hollow director body and a pair of hollow director arms formed integral with the hollow body to have an outline similar to the outline of the adapter body and arms, a divider positioned in the body of said wind director to divide the body into two substantially equal halves and the divider of the wind director being aligned with the divider of the adapter when the wind director is placed in registry with the adapter, an elongated slot in each of two opposite sides of the body and each of said slots extending into the respective arms formed integral with the body of the wind director, a baffle positioned in each of the arms for directing air leaving the slot in a direction perpendicular to the wind director in a horizontal plane, a deflector positioned on the upper portion of each side of the body for deflecting wind leaving the slot of the wind director in a vertical direction, and a cap mounted on the upper portion of the wind director to close the upper portion of the wind director.

2. In a machine for making glass bottles having a plate and a pair of split molds movably mounted on said plate, the improvement comprising, a wind box positioned on said plate between said molds for cooling the molds, said wind box including; a shell for conducting air through the wind box; a divider positioned in said shell dividing the wind box into two substantially equal halves; said shell having an outlet aperture adjacent to one of the molds, a second outlet aperture adjacent to the other of said molds and said divider separating the two apertures; and a pair of deflectors in said shell; each of said deflectors being adjacent to an outlet aperture for directing air flowing out of the shell through the aperture.

3. A wind box for use in a glass bottle making machine for cooling a mold comprising, in combination, an adapter removably mounted on a plate of a glass bottle making machine for covering an aperture in the plate to receive air under pressure into the adapter, said adapter having a hollow body and a hollow arm extending from said body, an ear formed integral with the body and extending outwardly from the body to cover a portion of the wind aperture in the plate to direct air into the body and arms of the adapter, a wind director positioned above the adapter and communicating with the adapter, said wind director having a hollow body and a hollow arm formed integral with the hollow body to have an outline similar to the outline of the adapter, an elongated slot in one side of the wind director body extending into the arm of the wind director, a baffle positioned in the arm for directing air leaving the slot, a deflector positioned in the upper portion of the body of the wind director adjacent to the slot for deflecting wind leaving the slot, and a cap mounted on the upper portion of the wind director to close the wind box.

4. A wind box for use in a glass bottle making machine for cooling a mold comprising, in combination, a cap, a wind director positioned below said cap and having its upper portion sealed closed by the cap, said wind director having a hollow body and an elongated slot on one side of the hollow body of the wind director, a deflector fixed to the wind director adjacent to the slot for directing wind leaving the slot, a spacer positioned below the wind director, and an adapter positioned below the spacer and communicating with the spacer to have an air flow path through the adapter into the spacer and through the wind director, said adapter having an ear extending outwardly therefrom on the same side as the side of the wind director containing the slot.

5. In a machine for making glass bottles having a split mold and a plate movably supporting the split mold, said plate having an air aperture positioned adjacent to the split mold, the improvement comprising, an adapter removably mounted on the plate over the air aperture, a wind director removably positioned above said adapter and being in communication therewith, said wind director having an open top and a concave arcuate side wall adjacent to the split mold, said arcuate wall having an elongated air slot, a baffle positioned in said wind director adjacent to one end of the slot for directing air leaving the slot toward the mold, a deflector in said wind director adjacent to the upper portion of said slot for directing the air leaving said slot toward said mold in an upward direction, and means connected to the wind director for closing the top of said wind director.

6. In a glass bottle making machine having a split mold and a plate movably supporting the split mold, said plate having an air aperture positioned adjacent to the split mold to provide a quantity of cooling air for cooling the mold, the improvement comprising, shell means open at bottom and top and mounted on said plate over said aperture to collect air leaving the air aperture through the open bottom, a hollow wind director body positioned above said shell means to receive the air collected by said shell means, said wind director having a concave arcuate side wall adjacent to the mold, said arcuate wall having a horizontally-elongated slot, a baffle positioned in said wind director adjacent to one end of the slot for directing air leaving the slot onto the split mold when the split mold is open, deflector means in said wind director adjacent to the upper portion of the slot also directing the air leaving the slot toward the mold and having angular disposition to distribute the air in a fan shape in a vertical direction to provide uniform cooling of the mold, and removable closing means engaging the upper portion of said wind director to close the top of the wind director.

7. In a glass bottle making machine having a pair of split molds and a plate movably supporting the split molds, said plate having an air aperture connected to a source of cooling air and positioned between said split molds to provide air for cooling said molds, the improvement comprising, shell means positioned on said plate for collecting air leaving said air aperture upwardly and distributing the air in a lateral direction, a hollow wind director seating upon said shell means and receiving collected air from said shell means, said wind director having a pair of elongated hollow arms formed integral with the hollow body, said wind director having a pair of concave arcuate side walls, each of said arcuate walls being a portion of the hollow body and one of the hollow arms and being adjacent to one of the split molds, each of said arcuate side walls having an elongated slot, a vertical baffle positioned in each of said arms adjacent to one end of the respective slot for directing cooling air leaving the slot toward the adjacent mold and into the mold when the mold is in an open attitude, a deflector mounted in said wind director adjacent to each of the slots and the upper portion thereof for directing air leaving its respective slot toward its respective split mold and having an angular attitude directing the air in a fan shape in a vertical direction to provide uniform cooling of the respective mold, and closing means connected to the upper portion of the wind director for closing the top thereof.

8. In a machine for making glass bottles having a pair of split molds and a plate movably supporting the molds, said plate having an air aperture positioned between the split molds for providing cooling air to the molds, the improvement comprising, a wind box removably positioned over said aperture in the plate, said wind box including, an adapter removably positioned on the plate covering the aperture in the plate for receiving air under pressure, said adapter having a hollow body and a pair of hollow arms extending from said body, a pair of ears formed integral with the body and extending outwardly from opposite sides of the body to cover a portion of the wind aperture in the plate to direct air into the body of the adapter and the adapter arms, a divider extending through the central portion of the adapter body to divide the body into two substantially equal halves, a hollow spacer removably stacked above the adapter and in communication therewith, said spacer having a hollow body registering with the hollow body of the adapter and a pair of hollow arms registering with the hollow arms of the adapter, a spacer divider extending through the central portion of the spacer and registering with the adapter divider, a wind director having a hollow body and a pair of integral hollow arms with a divider in the central portion of the director to divide the director into two substantially equal halves removably stacked in registry with the spacer, said director having a pair of slots, each of said slots being in a side of the body and extending into the respective hollow arm of the director, a baffle positioned in each of said hollow arms of the wind director adjacent to the slot for directing the flow of air out of the slot, a pair of deflectors fixed to the wind director, each of said deflectors being fixed to the hollow body of the wind director above the slot and extending toward the divider in the central portion of the wind director, and a cap removably stacked above said wind director to close the wind box.

9. A windbox structure for cooling molds of the type adapted to stand close above a wind tunnel which has air outlets delivering cooling air upwardly from approximately the bottom level of the molds, said structure comprising, namely: an adapter shell defined by an upstanding circuitous wall structure open at top and bottom and of a size to straddle one of said air outlets crosswise; opposite side-wall portions of said wall structure being concavely curved; a deflecting flange projecting outwardly of each said curved side-wall portion at the lower region thereof and constituting an ear adapted to overlie a portion of an appertaining one of said air outlets for deflection of air laterally toward the lower part of a mold disposed adjacent said adapter; a web disposed internally of the adapter dividing the same into two sections each contiguous with one of said curved side-wall portions; a wind director comprising a further mating shell member having a side wall and open top and bottom configurations conformable to that of the adapter and fitting in regisry above the adapter to receive air therefrom; each of the curved side-wall portions of the wind director having a horizontally-elongated slot therein above the appertaining ear flange and adapted to confront an upper portion of a mold as aforesaid, said elongated slots each constituting a sidewise exit for cooling air from the adapter; cap means seating upon the open top portion of the wind director to close the same; baffle means adjacent end portions of the respective elongated slots for directing air in a first predetermined direction toward a mold as aforesaid; and deflection means in the wind director contiguous to each said elongated slot at points respectively spaced from the appertaining baffle means and having an angular disposition to deflect air in a generally upwardly-diverging fan pattern toward upper portions of a mold disposed as aforesaid.

References Cited by the Examiner
UNITED STATES PATENTS

| | | | |
|---|---|---|---|
| 443,403 | 12/1890 | Neville | 65—356 |
| 1,632,992 | 6/1927 | Bragg | 65—355 |
| 1,633,028 | 6/1927 | Lafrance | 65—355 |
| 2,402,475 | 6/1946 | Waterbury et al. | 65—371 X |
| 2,964,879 | 12/1960 | Gibson | 65—355 |

DONALL H. SYLVESTER, *Primary Examiner.*